July 8, 1958
W. H. OWENS
2,841,858
MINERAL WOOL AND METHOD OF TREATING AND
COLORING THE SAME
Filed Feb. 8, 1955
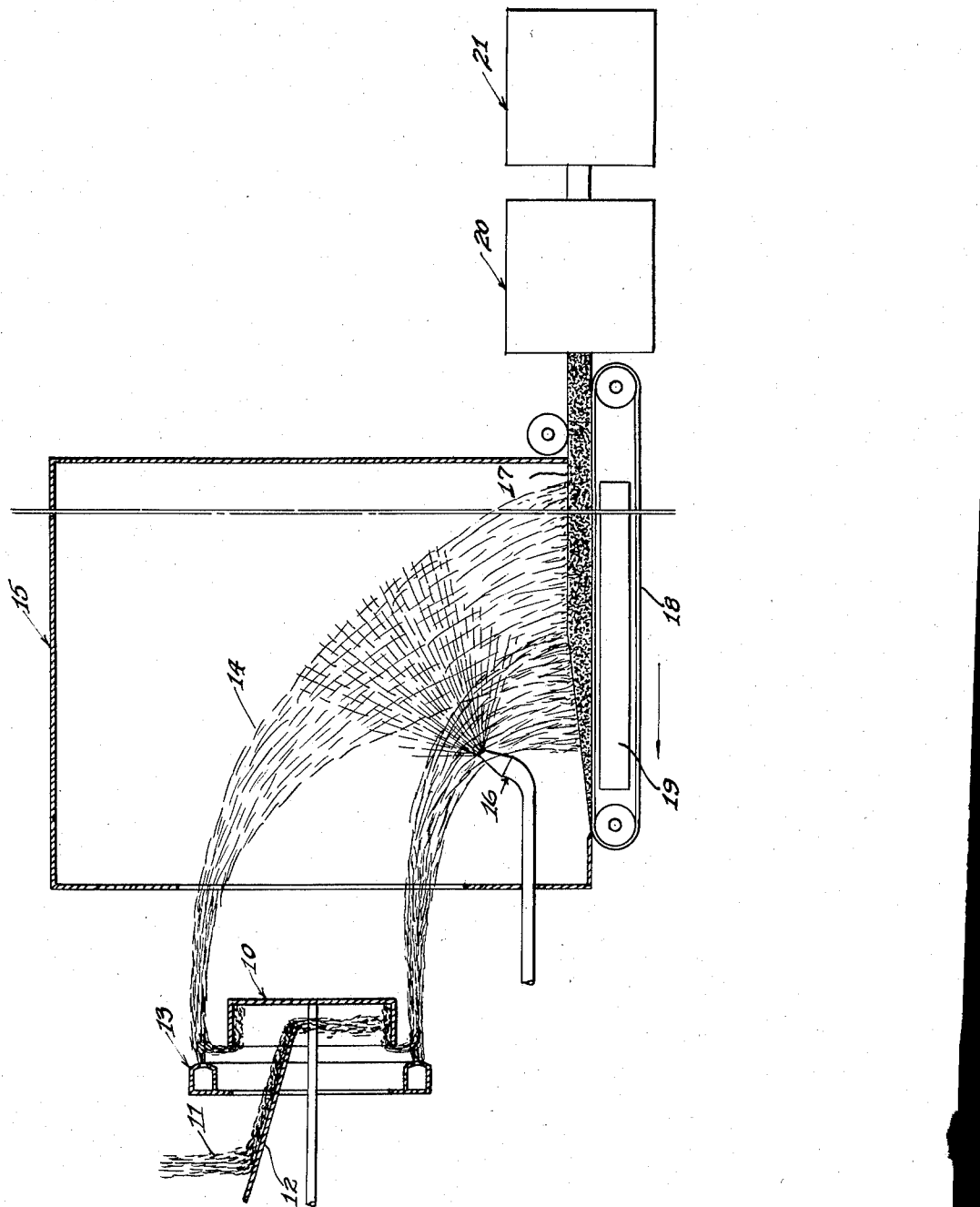
Inventor.
William H. Owens
by Wilson & Seffert
Atty's

United States Patent Office
2,841,858
Patented July 8, 1958

2,841,858
MINERAL WOOL AND METHOD OF TREATING AND COLORING THE SAME

William H. Owens, Wabash, Ind., assignor to American Rock Wool Corp., Wabash, Ind., a corporation of Indiana Application February 8, 1955, Serial No. 486,999

10 Claims. (Cl. 28—74)

The present invention relates to mineral wool adapted for use as a thermal insulating material, and more particularly to a novel method or manner of treating and coloring mineral wool and to the novel product produced by such method.

Mineral wool is a fibrous material that may be produced from molten rock or mineral slag by any suitable means or mechanism such as fiberizing or spinning apparatus, steam jets, etc., which is capable of disintegrating and transforming the molten rock or mineral slag into a mass of fibers having a relatively low density but relatively high thermal insulating qualities. The fibers so formed may be treated with an annealing or waterproofing composition and/or binder and then collected to subsequently form a wide variety of mineral wool products.

It is an important object of the present invention to provide a novel method and manner of treating and coloring the normally white mineral wool fibers, produced by means of a fiberizing or spinning apparatus, steam jets, etc., with an atomized mixture of an annealing oil, pigment or coloring matter and wetting agent or surface active agent, such mixture being sprayed onto the fibers preferably at the entrance to the blow chamber in which these fibers are collected. This annealing oil serves to retain the pigment onto the fiber and is further employed for dust control and lubrication of the resulting fibers to overcome brittleness and harshness, while the wetting agent or surface active agent facilitates dispersion of the pigment or coloring agent in the oil.

The present invention further comprehends the coloring of the mineral wool produced by the dispersing of an inorganic pigment, such as iron oxide, in the annealing oil. This dispersion is readily accomplished by passing the mixture of oil and pigment through conventional paint grinding equipment, such as a relative high speed propeller type mixer, a roller mill or a paint mill, to intimately mix the oil, pigment and a wetting agent. The pigmented annealing oil is subsequently applied to the fibers in the form of a fine spray.

The present invention is particularly directed to treating and coloring of the substantially white wool at the point of fiberization with a mixture of a coloring agent, an annealing oil and a wetting agent. By applying this coloring agent dispersed in the annealing oil at or adjacent the portal or entrance to the collecting or blow chamber for the formed fibers or the wool room, such fibers are treated and colored in a convenient and most economical manner. The composition of the coloring agent, which is preferably a yellow iron oxide pigment that is ground into and dispersed in the annealing oil, is such that it oils or anneals the resulting wool and colors it simultaneously in a single operation. The color produced in this way neither rubs off nor leaches out of the treated fibers.

In the manufacture of batts and industrial felts from mineral wool fibers, the blanket of collected mineral wool fibers after treatment and curing is trimmed to form batts or industrial felts of predetermined dimensions. The resulting trim and any rejects from the blanket of collected wool may be subsequently granulated for use as bulb insulation. As such batts and industrial felts in their production require relatively expensive treatment, including the application of a resinous binder containing phenol-formaldehyde resins and subsequent curing of the binder, the preparation of granulated wool from a blanket of mineral wool so produced and treated is too expensive to permit its commercial or general use as bulk insulation of the type and for the purpose herein contemplated, whereby such granulated wool has been limited to that prepared from trim or rejects.

The amount of trim or rejects resulting from the manufacture of batts and industrial felt being limited and insufficient to meet the continued demand for granulated wool which has a ready market for bulk insulation, much time and effort has been expended in endeavoring to produce and supply a granulated wool having substantially the same color and insulating properties or characteristics as the granulated batt and felt trim and rejects so that these products may be sold interchangeably or combined to meet the needs and assure an adequate supply.

To satisfy these needs, the present invention has for an object the provision of a novel method of treating this substantially white granulated wool in such manner that it may be readily and economically colored to match the granulated batt and felt trim. Thus two sources of supply of colored granulated wool are made available and one may be conveniently substituted for the other or they may be mixed in whatever proportions are most convenient from a production point of view. In fact, the treating composition on the normally white or virgin wool is found to eliminate or substantially reduce dust from the added trim that is mixed therewith.

In the treating and coloring of the normally or initially white bulk mineral wool, the present invention contemplates a novel treating and coloring composition or mixture was well as a novel method or process of treating and coloring such bulk wool in a most economical and convenient manner. Much research and expense has been incurred in developing the novel composition for treating and coloring the normally white mineral wool to incorporate therein the desired properties and characteristics, as well as in developing the novel method and manner of treating and coloring this mineral wool whereby it may be economically produced and is capable of being sold as a substitute for or in combination with mineral wool available from trim and/or rejects resulting from the production of batts and industrial felts. Although numerous other methods of and compositions for treating and coloring the normally white mineral wool have been tested, the expense involved in their formulation and use has so increased the cost of the resulting product as to make their use commercially impracticable.

The bulk fibers produced, colored and treated in the manner disclosed, are then passed through a shredder or granulator to convert the bulk wool blanket into tufts, after which these tufts are passed through a revolving screen to remove shot and to roll these tufts into pellets. As the granulated wool prepared by this process is sufficiently similar or comparable in appearance and physical characteristics with granulated wool prepared from batt and felt trim or rejects, they are interchangeable and may be sold separately or in combination whereby the producer and supplier are assured of an adequate supply. In fact, granulated wool prepared in accordance with the present invention may be mixed with granulated wool from batt and felt trim or rejects in whatever proportions are most feasible from the standpoint of production.

In the drawing there is shown a diagrammatic view of an illustrative embodiment of fiberizing mechanism and the novel manner of forming, treating and coloring the formed mineral wool fibers of the present invention. This fiberizing or spinning mechanism includes a cup-shaped spinner or rotor 10 receiving the molten slag 11 from a guide spout or directing plate 12. The molten slag ejected from the discharge edge of the open end of the rapidly rotating spinner or rotor is intercepted by an annular steam ring or blowcap 13 and fiberized. The fibers 14 in the wool room or collecting chamber 15 are sprayed by a nozzle or atomizing means 16 and the treated fibers are drawn and collected as a bulk wool blanket or mat 17 upon a travelling belt 18 in the bottom of the collecting chamber 15. A suction box 19 draws these fibers onto the belt. The blanket is then passed through a shredder or granulator 20 and then through a revolving screen 21 to remove shot and roll the tufts into pellets.

The annealing or treating oil is preferably a relatively high flash, relatively heavy bodied naphthenic or paraffinic type oil, preferably having substantially the following properties:

| | |
|---|---|
| A. P. I. gravity | 19 to 21 |
| Flash, min | 425° F. to 450° F. |
| Fire, min | 485° F. to 500° F. |
| Saybolt viscosity, 100° F | 700 to 800 sec. |
| Saybolt viscosity, 210° F | 60–70 sec. |
| Pour point, max | 5° F. to 10° F. |
| Color ASTM, max | 4 |

The wetting or surface active agent for facilitating dispersion of the pigment or coloring agent in the annealing oil, may be classified as a liquid soap that is preferably readily soluble in the annealing oil. One wetting agent that has given excellent results is a non-ionic, multi-component mixture of high molecular weight amine condensation products and polyhydric alcohol esters. Although fatty acids are present, they are sufficiently tied up chemically so as not to be present in free form. Numerous wetting or surface active agents several of which are commercially available under the trade names "Tenlo" and "Aerosol" have given satisfactory results.

Synthetic iron oxide pigments have generally given better results than natural yellow iron oxide pigments, the former producing greater color intensity on the wool fibers than the latter and requiring a lesser amount of the wetting or surface active agent to disperse the pigment in the oil. The color intensity may be altered by changing the percentage of pigment in the dispersion.

The above examples of annealing oils, wetting or surface active agents and pigments or coloring matter are but illustrative and are not intended as limiting the present invention.

In the preparation of the treating and coloring composition or mixture, the proper amount of annealing oil is added to the tank or container of the mixing equipment such as a high speed mixer, ball or roller mill, or other suitable mixing equipment capable of intimately mixing the ingredients. To this is then added a small amount of the wetting or surface active agent which is thoroughly mixed with the oil. The pigment or coloring matter is then slowly and evenly added to the annealing oil and wetting agent and the mixing continued until the ingredients are intimately mixed. The mixture so produced is preferably sprayed or projected onto the mineral wool fibers by a blowcap or other atomizing means.

As an example of the composition of mixture or dispersion employed, excellent results have been obtained by employing a mixture or dispersion containing approximately 20% to 22% by weight of the pigment or coloring agent, approximately 78% to 80% by weight of an annealing oil, and approximately 0.4% of the wetting agent. To facilitate the dispersion of the pigment or coloring matter in the oil, a small amount (less than 1%) of a wetting agent or a surface active agent is preferably added. To reduce the viscosity of this mixture or dispersion when necessary or desirable, fuel oil may be added in a suitable amount.

Approximately two to three gallons of the mixture or dispersion per ton of granulated wool is generally sufficient to adequately color and anneal or oil the wool in its formulation. However, it will be apparent that the proportions above given may be substantially varied to give the contemplated results, and that such proportions and example are but illustrative and not intended as limiting the invention.

From the above disclosure, it is believed clear that the present invention solves an important problem in the manufacture of granulated wool and assures an adequate supply thereof to meet the demand for this bulk insulating material. Granulated wool treated as herein contemplated eliminates dust in the resulting product. As the granulated wool formed in this manner is interchangeable with and may be mixed in any desired proportions with granulated wool formed of batt and felt trim and rejects, most effective use of the fiberizing and granulating equipment is assured.

In the preparation of granulated mineral wool from an admixture of (1) the normally white or virgin wool that has been treated in the manner set forth above, and (2) the batt or felt trim and/or rejects, these are collected and combined in any desired proportions prior to their passage into the granulating or shredding equipment where the combined wool is processed to form granulated mineral wool. When the normally white or virgin wool treated in the manner herein disclosed is mixed with wool formed of felt trim and rejects, dust which is generally inherent in the use of the latter is substantially reduced or eliminated in the combined product.

Having thus disclosed the invention, I claim:

1. The method of producing mineral wool, including the steps of preparing a treating composition comprising an intimate mixture consisting of an annealing oil and a small quantity of a wetting agent intimately mixed together and to which is then added and thoroughly mixed a yellow iron oxide pigment for producing a mineral wool of substantially golden color, spraying said mineral wool fibers with said treating composition subsequent to fiberization and prior to their collection, passing the treated fibers through a shredder to convert the bulk wool blanket into tufts, removing shot from the tufts and rolling these tufts into pellets.

2. The method of producing granulated mineral wool of a substantially golden color, comprising the steps of supplying to mineral wool fibers in the wool chamber a treating mixture consisting of a yellow iron oxide pigment, an annealing oil and a surface active agent in which the annealing oil retains the pigment onto the fibers and the surface active agent facilitates dispersion of the pigment in the oil, spraying the produced wool fibers with the treating mixture, passing the treated fibers through a shredder to convert the bulk wool blanket into tufts, removing shot from the tufts and rolling these tufts into pellets.

3. The method of producing colored mineral wool, comprising spraying onto mineral wool fibers a mixture containing a pigment for coloring the fibers, an annealing oil in which said pigment is uniformly dispersed for retaining the pigment on said fibers, controlling dust in the resulting product and lubricating the fibers, and a surface active agent for facilitating the dispersion of the pigment in the oil, the proportions of said ingredients being approximately 20% to 22% of pigment, approximately 78% to 80% of oil and less than 1% of the surface active agent.

4. A granulated wool insulation comprising granulated bulk wool fibers treated with a dispersion of a yellow iron oxide pigment and an annealing oil in which the pigment is uniformly dispersed, said annealing oil retaining the pigment, controlling dust in the resulting product and lubricating the fibers to prevent brittleness, the proportions of said ingredients being approximately 20% of pigment and approximately 80% of annealing oil.

5. The method of producing granulated mineral wool from a quantity of batt and felt trim of substantially golden color and a quantity of initially white mineral wool in which the initially white mineral wool fibers are treated with a dispersion of an annealing oil and a coloring agent to simulate the color of the trim, comprising the steps of spraying and coloring the initially white mineral wool fibers with said dispersion to coat and color said fibers, combining these treated fibers with batt and felt trim of similar color, and granulating the combined mineral wool to provide bulk insulation in which said dispersion substantially reduces dust in the resulting product.

6. The method of producing granulated mineral wool suitable for bulk insulation, comprising the steps of treating normally white mineral wool fibers with a dispersion of an inorganic yellow iron oxide pigment and an annealing oil, mixing with said treated fibers processed mineral wool obtained from colored batt and felt trim containing a resinous binder and colored a substantially golden color, and granulating the mixture to provide a granulated mineral wool in which the mixture is of substantially uniform color.

7. The method of producing granulated mineral wool, comprising the steps of adding to mineral wool obtained from processed batt and felt trim of a substantially golden color mineral wool fibers treated with a dispersion of an annealing oil and a yellow oxide pigment for coloring the fibers a substantially golden color to simulate that of the trim, and granulating the combined trim and treated fibers to produce a mixture of substantially uniform color, said dispersion covering the fibers and allaying dust inherent in the trim.

8. A granulated mineral wool comprising a combination of bulk mineral wool fibers treated with a dispersion of an inorganic pigment and an annealing oil in which said pigment is uniformly dispersed, and processed batt and felt trim mixed together and granulated, said pigment coloring the bulk mineral wool fibers a color simulating that of the trim and said dispersion substantially reducing dust inherent in the granulated trim.

9. A granulated mineral wool insulation comprising a mixture of processed trim of substantially golden color obtained from batts and industrial felt and virgin mineral wool fibers treated with an annealing oil and a coloring agent simulating the color of the processed trim whereby the mixture is of substantially uniform color.

10. A granulated mineral wool insulation consisting of a mixture of processed trim of substantially golden color obtained from batts and industrial felt containing a resinous binder, and virgin wool fibers treated with a dispersion of yellow iron oxide pigment and an annealing oil for retaining the pigment onto the fibers and lubricating said fibers, said pigment coloring the fibers to substantially conform to the color of the processed trim.

References Cited in the file of this patent

UNITED STATES PATENTS

| | | |
|---|---|---|
| 2,019,021 | O'Brien | Oct. 29, 1935 |
| 2,083,132 | Williams et al. | June 8, 1937 |
| 2,184,320 | Simpson | Dec. 26, 1939 |
| 2,233,433 | Smith | Mar. 4, 1941 |
| 2,593,818 | Waggoner | Apr. 22, 1952 |

FOREIGN PATENTS

| | | |
|---|---|---|
| 555,481 | Great Britain | Aug. 25, 1943 |

UNITED STATES PATENT OFFICE
CERTIFICATE OF CORRECTION

Patent No. 2,841,858                                                  July 8, 1958

William H. Owens

It is hereby certified that error appears in the printed specification of the above numbered patent requiring correction and that the said Letters Patent should read as corrected below.

Column 2, line 2, for "bulb" read -- bulk --; line 15, for "grandulated" read -- granulated --; line 38, for "was" read -- as --; column 3, line 27, for "5° F. to 10° F." read -- -5° F. to 10° F. --.

Signed and sealed this 23rd day of September 1958.

(SEAL)
Attest:

KARL H. AXLINE                                          ROBERT C. WATSON  
Attesting Officer                                       Commissioner of Patent